United States Patent [19]

Wheadon

[11] 4,396,691
[45] Aug. 2, 1983

[54] BATTERY HAVING SEPARATOR SHEATHED/SUPPORTED PLATES

[75] Inventor: Ellis G. Wheadon, Bernville, Pa.

[73] Assignee: General Motors Corporation, Detroit, Mich.

[21] Appl. No.: 332,164

[22] Filed: Dec. 18, 1981

[51] Int. Cl.³ ............................................. H01M 2/18
[52] U.S. Cl. .................................... 429/136; 429/139
[58] Field of Search ........................ 429/136, 139, 131

[56] References Cited

U.S. PATENT DOCUMENTS 3,514,331  5/1970  Cupp et al. .......................... 429/136

Primary Examiner—Anthony Skapars
Attorney, Agent, or Firm—Lawrence B. Plant

[57] ABSTRACT

An electric storage battery including plates of one polarity sheathed in envelopes of separator material wherein each envelope includes a pouch for supporting the distal end of an adjacent opposite polarity plate.

2 Claims, 5 Drawing Figures

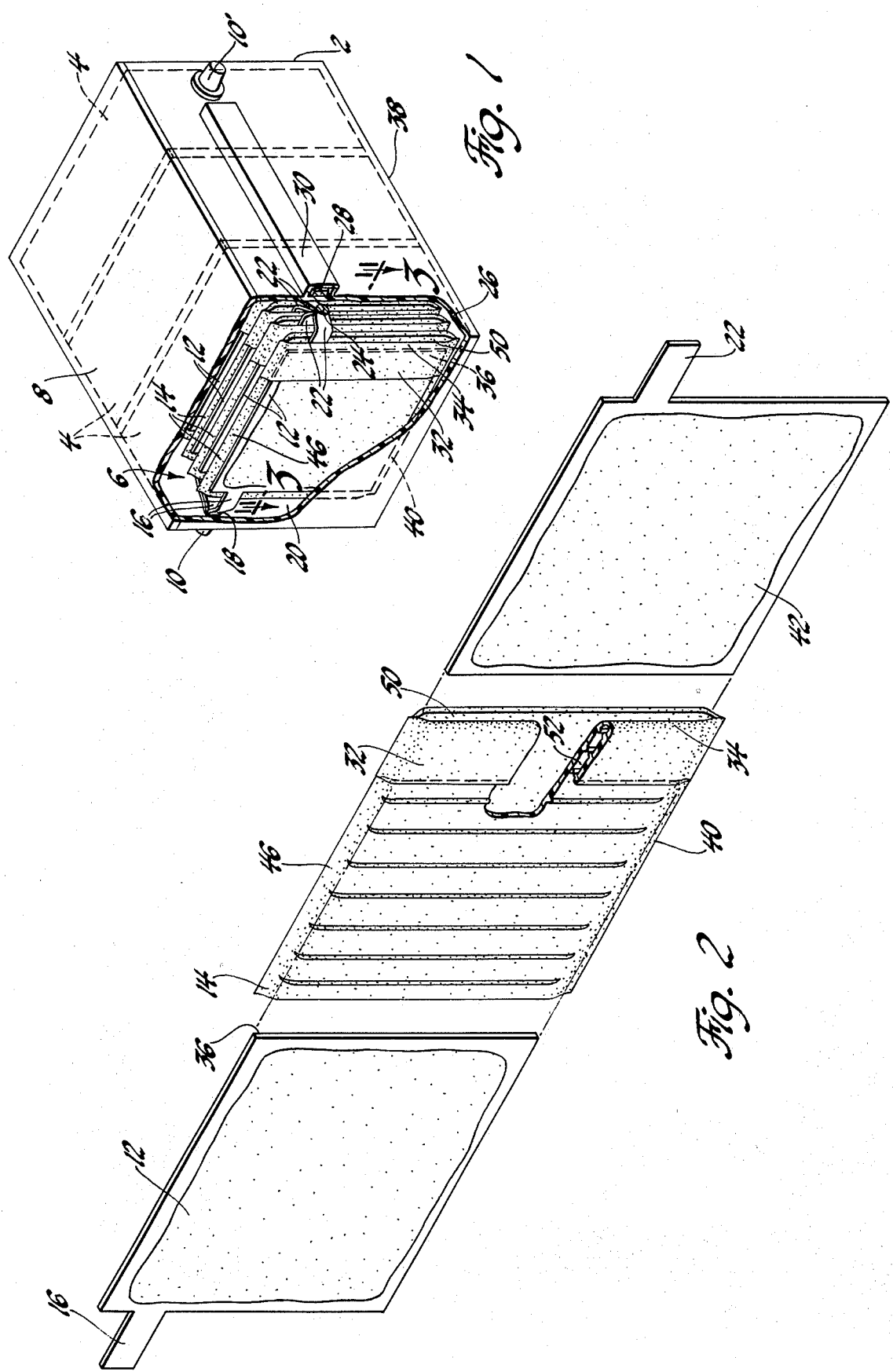

BATTERY HAVING SEPARATOR SHEATHED/SUPPORTED PLATES

BACKGROUND OF THE INVENTION

This invention relates to electric storage batteries and more particularly to batteries wherein the electrochemically active cell elements (i.e., interleaved positive and negative polarity plates) have some plates enveloped in a sheath of battery separator material.

Battery separators are well known in the art and comprise microporous membranes interjacent adjacent electrodes in a cell element and serve to separate and electrically isolate one (e.g., positive electrode) from the other (e.g., negative counter-electrode). Such separators have sufficiently small pores to suppress interelectrode dendrite growth but sufficiently high porosity to permit electrolyte mobility within the cell. A typical such material comprises sintered PVC particles such as described in Bahler et al U.S. Pat. No. 3,551,210.

Some battery manufacturers envelope all the positive or negative plates in individual sheaths or envelopes formed from the separator material. Enveloping the plates in separator sheaths improves handling of the elements and reduces the possibility of dendrite-produced, interelectrode shorting at the edges of adjacent positive and negative plates (i.e., edge shorting). A typical such sheath comprises an elongated strip of separator material folded transverse its length and heat sealed together along two edges. The fourth edge is typically left open.

In the battery, the sheath rests on the bottom of the container and supports its enveloped plate above the bottom of the container by an amount equal to the thickness of the sheath at its bottom edge. One end of the enveloped plate projects out the open edge of the sheath (usually by means of a plate lug) and is electrically joined to other electrode plates of like polarity within the cell element. Such joining may be effected by means of a conventional plate strap extending the length of the element or by simply bundling and fusing the several plate lugs together into a post such as disclosed in United States patent application Ser. No. 259,975 filed May 4, 1981 in the names of William J. Chafin et al and assigned to the assignee of the present invention. In a single cell battery, the plate straps or posts are appropriately connected through the container wall to the output terminals of the battery. In a multicell battery, the cell element of one cell is electrically coupled to similar elements in the next adjacent cell compartments by means of intercell connectors joined to the plate straps or posts. In either case, the ends of the plates which are joined together are effectively anchored against movement to either the battery container external wall or intercell partition separating adjacent cell compartments. The distal edge of the plate (i.e., opposite the anchored lug-bearing edge) is neither joined to other plates nor anchored to the container and hence is free to move up and down within the container incident to vibration, rough handling, etc.

Such movement stresses the plate lug causing fatigue and potential breaking of the lug of a plate unrestrained against such movement. In the case of sheathed plates, the sheath resting on the bottom of the container tends to support the encased plate against such potentially destructive movement. Unsheathed plates, on the other hand, run a high risk of lug breakage when the plates are located above the bottom of the container so as to be aligned with the sheathed plates. This problem is particularly acute in batteries where the plate lugs project from the sides of the plates (i.e., rather than the tops) and the stress on the lug is at a maximum. Moreover it is difficult during assembly to properly axially align unsheathed plates with sheathed plates due to the different outside dimensions of each. In this regard, the sheathed plates are supported above the bottom of the container by a distance equal to the thickness/width of the edges of sheaths, while the unsheathed plates tend to settle to the bottom of the container out of axial alignment with the sheathed plates. This settling cants the plate and stresses the lugs thereof.

It is an object of the present invention to provide a storage battery having plates of one polarity sheathed in battery separator material and interleafed with unsheathed plates of opposite polarity wherein the sheaths support the unsheathed plates above the bottom of the battery container and in substantial alignment with the sheathed plates.

This and other objects and advantages of the present invention will become more readily apparent from the detailed description thereof which follows and which is given in conjunction with the several drawings in which:

FIG. 1 is a partially broken away, perspective illustration of a battery in accordance with the present invention;

FIG. 2 is an exploded, perspective illustration of a positive and negative plate couple and pouch-bearing sheath in accordance with the present invention;

BRIEF DESCRIPTION OF THE INVENTION

Figure 3:
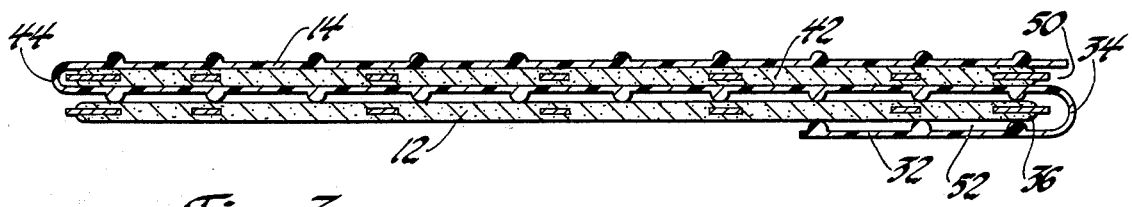
FIG. 3 is a sectioned view through a positive and negative sheathed plate couple taken in the direction 3—3 of FIG. 1.

The present invention comprehends an electric storage battery the electrochemically active cell elements of which comprise a plurality of first polarity plates (e.g. negative) alternately interspersed a plurality of opposite polarity plates (e.g. positive) wherein the plates of one polarity are each encased in a sheath of battery separator material and supported above the bottom of the battery container by a distance equal to the thickness/width of the sheath along the bottom edge thereof. The plates of the other polarity are supported above the bottom of the battery container and held in substantial alignment with the one polarity plates by a swath of separator material secured along one edge of an adjacent sheath so as to form a pouch for receiving the distal end of the opposite polarity plate (i.e., remote from the end for joining the plate to like plates in the cell element).

DETAILED DESCRIPTION OF SPECIFIC EMBODIMENTS OF THE INVENTION

FIG. 1 depicts a Pb-acid storage battery comprising a container 2 defining three cell compartments 4 each housing a battery cell element 6. A cover 8 seals closed the container 2. Terminals 10 and 10' at either end of the battery serve to connect the battery to an appropriate external load. The cell element 6 comprises a plurality of positive plates 12 alternately interspersed (i.e. interleafed) a plurality of negative plates encased within sheaths 14 of separator material. The several positive plates 12 each have a lug 16 on one end thereof and the several lugs 16 are joined together at positive element post 18 for joining to battery terminal post 10. Joining the element post 18 to the terminal 10 and securing it to the container side wall 20 effectively anchors the left side of the positive plates firmly against movement incident to vibration, handling and shock. Similarly the several negative plates each have a lug 22 on one end thereof (i.e., opposite the lug end of the positive plates) and the several lugs 22 are joined together at negative element post 24 for joining through the side wall 26 of the container 2 to an external intercell connector 28 housed in a covered channel 30 formed on the outside of the container 2.

A band or swath of separator material 32 is formed integral with and along the edge 34 of the sheath 14 and defines a pouch for receiving the distal end 36 (i.e., remote from lug 16) of the positive plate 12. The pouch supports the distal end 36 of the positive plate 12 off the bottom wall 38 of the container by a distance equal to the thickness/width of bottom edge 40 of the sheath 14. In so doing the distal end 36 of the plate 12 is anchored firmly to the adjacent sheathed negative plate adjacent the end where the negative plate is anchored to the container wall 26. As a result, the positive plate 12 is held securely in axial alignment with the negative plates in the sheaths 14.

FIG. 2 is an enlarged, exploded view of a negative plate 42, positive plate 12 and pouch-bearing sheath 14 prior to assembly with other similar plate-sheath sets into a cell element 6.

FIG. 3 is a sectioned view in the direction 3—3 of FIG. 1 showing the plate-sheath set of FIG. 2 after the plates, sheath and pouch have been integrated. In this embodiment the sheath 14 is formed from a single elongated strip of separator material folded (e.g., at the left side of the Figures) to provide one lateral edge 44 of the sheath 14 and folded again, in the opposite direction (e.g., at the right side of the Figures), at the opposite lateral edge 34 of the sheath 14. The top and bottom edges 46 and 40 respectively, of the sheath and swath are then joined (i.e., preferably by heat sealing) together to form the open-mouth 50 of sheath 14 and integral pouch 52. One example of such a design successfully tested had a sheath which measured 123 millimeters from side-to-side, 182 millimeters top-to-bottom and a 25 millimeter wide swath along the side of the sheath.

Figure 4:
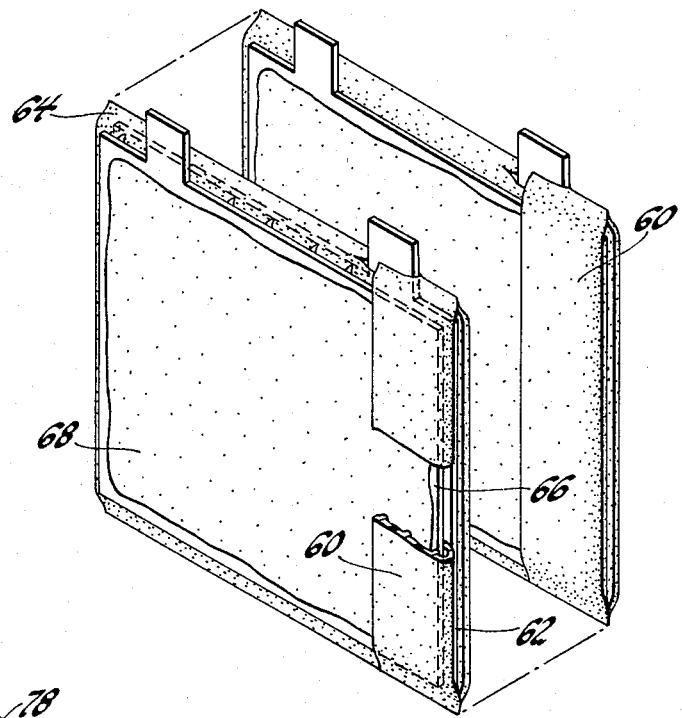
FIG. 4 is a perspective illustration of another embodiment of the present invention; and, FIG. 5 is a perspective illustration of still another embodiment of the present invention.
Figure 5:
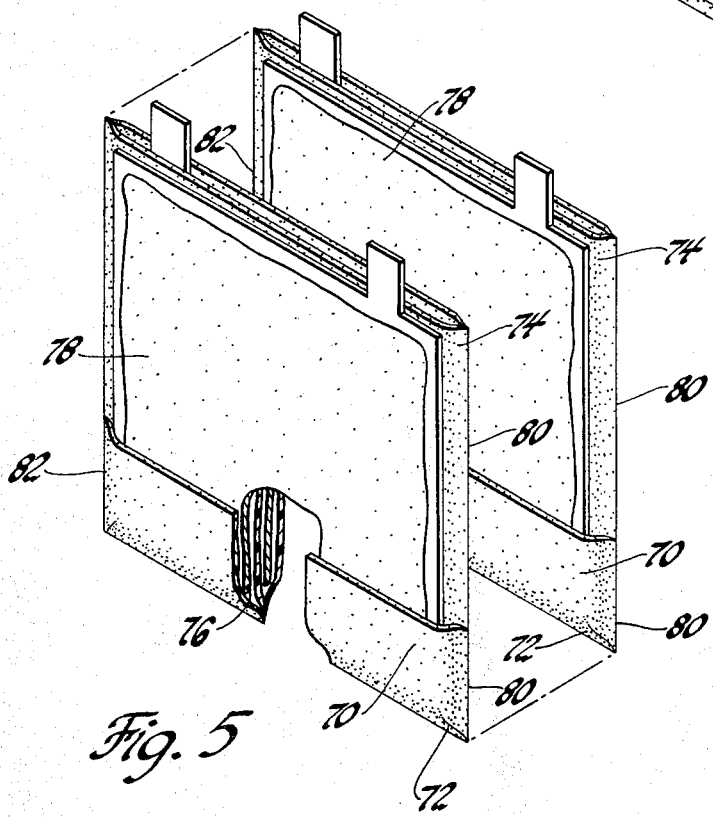

FIGS. 4 and 5 are other embodiments of the invention as applied to top-lug plates. FIG. 4, like FIGS. 1-3, has the swath of separator material 60 secured to the lateral edge 62 of the sheath 64 for supporting the distal end 66 of the positive plate 68 off the bottom of the battery container. In FIG. 5, on the other hand, the swath 70 lies along the bottom edge 72 of the sheath 74 for supporting the distal end 76 of the positive plate 78 off the bottom of the container. In this embodiment the sheath 74 and swath 70 are heat sealed together along the bottom 72 and lateral edges 80 and 82, respectively.

While this invention has been disclosed primarily in terms of specific embodiments thereof it is not intended to be limited thereto but rather only to the extent set forth in the claims which follow.

The embodiments of the invention in which an exclusive property or privilege is claimed are defined as follows:

1. An electric storage battery including a container having bottom, side and end walls defining at least one cell compartment and an electrochemically active cell element housed within said compartment, said element comprising:

a plurality of first polarity plates alternately interspersed a plurality of opposite polarity plates, said opposite polarity plates each having a first end joined to other opposite polarity plates in said element and a distal end remote from said first end;

a sheath encasing each of said first polarity plates and comprising a microporous, dendrite-suppressing, battery separator material having a lower edge resting on said bottom wall and lateral edges extending upwardly from said lower edge substantially parallel to said side walls; and a swath of said separator material integral with said sheath and lying along at least one of said edges to define a pouch for receiving the distal end of an adjacent opposite polarity plate and supporting such opposite polarity plate above said bottom wall and in substantial alignment with said first polarity plates.

2. An electric storage battery including a container having bottom, side and end walls defining at least one cell compartment and an electrochemically active cell element housed within said compartment, said element comprising:

a plurality of first polarity plates alternately interspersed a plurality of opposite polarity plates, said opposite polarity plates each having a first end joined to other opposite polarity plates in said element and a distal end remote from said first end, said first end lying adjacent a said side wall of said container;

a sheath encasing each of said first polarity plates and comprising a microporous, dendrite-suppressing, battery separator material having a lower edge resting on said bottom wall and lateral edges extending upwardly from said lower edge substantially parallel to said side walls; and a swath of said separator material integral with said sheath and lying along at one of said lateral edges to define a pouch for receiving the distal end of an adjacent opposite polarity plate and supporting such opposite polarity plate above said bottom wall and in substantial alignment with said first polarity plates.

* * * * *